Nov. 29, 1966 M. J. MAROSZ 3,289,169

REDUNDANCY REDUCTION MEMORY

Filed Sept. 27, 1962 6 Sheets-Sheet 1

INVENTOR.
MARION JOHN MAROSZ
BY Samuel B. Stone
ATTORNEY

INVENTOR.
MARION JOHN MAROSZ
BY
Samuel B. Stone
ATTORNEY

INVENTOR.
MARION JOHN MAROSZ
BY Samuel B. Stone
ATTORNEY

REDUNDANCY REDUCTION MEMORY

Filed Sept. 27, 1962

INVENTOR.
MARION JOHN MAROSZ
BY
Samuel B. Stone
ATTORNEY

INVENTOR.
MARION JOHN MAROSZ
BY
Samuel B. Stone
ATTORNEY

Nov. 29, 1966 M. J. MAROSZ 3,289,169

REDUNDANCY REDUCTION MEMORY

Filed Sept. 27, 1962 6 Sheets-Sheet 6

INVENTOR.
MARION JOHN MAROSZ
BY
Samuel B. Stone
ATTORNEY 3,289,169

REDUNDANCY REDUCTION MEMORY

Marion J. Marosz, Downey, Calif., assignor to Beckman Instruments, Inc., a corporation of California Filed Sept. 27, 1962, Ser. No. 226,675
12 Claims. (Cl. 340—172.5)

This invention relates to memories and more particularly to a unique memory arrangement and method which may be utilized to achieve a reduction in data redundancy.

Frequently it is desirable to know when new data being written into a memory is different from the data already in a particular memory location. In the field of telemetry, for example, there are many instances in which telemetered data does not change from frame to frame and it is advantageous to transmit only that data which has changed since the last time when data changed. In other words, certain data frequently is redundant and it is not necessary to transmit this redundant data, but only necessary to provide some indicia that present data is the same as that last transmitted. This objective may be accomplished by the utilization of elaborate electronic equipment associated with the telemetry system to sense data redundancy and to provide a signal or signals indicating that following data is redundant without actually transmitting the redundant data itself. For example, logical circuitry may be utilized to compare new data with that data present within the memory. The logical circuitry involved frequently is extensive in addition to the necessity of providing a large amount of extra storage capacity.

Accordingly, it is a feature of the present invention to provide a memory in which a comparison between new and old data takes place within the memory itself, with indicia of the changed data being stored in the memory.

An additional feature of the present invention is the provision of a memory arrangement for determining if new data has been read into the memory without the necessity of extensive additional memory capacity and extensive external logical circuitry.

Another feature of the present invention is the provision of a memory comprising device having at least two states and in which new data is stored and compared with data previously stored in a particular memory location, and in which "flag bits" are stored which indicate whether the new data is the same as that previously stored.

According to the present invention, a memory is provided which includes a small storage area for storing "flag bits" which indicate that newly stored data is different from that previously stored in a particular memory location. The memory itself is conventional, and data may be read into and out of the memory in series or in parallel. Data is read into the memory of two cycles, i.e., the like bits (such as zeroes) of a word are read into the memory and then the opposite like bits (such as ones) of a word are read into the memory. Conventional coincident current techniques may be utilized in reading and writing the data. When a new word is different from the previously stored word, an output signal is provided which indicates that the new word is not the same as the old word. In this instance a "flag bit" one is stored which indicates that a new and different word has been stored in the particular memory location. Thus, the memory stores the new words and stores "flag bits" which indicate whether or not the new words are different from previously stored words. The memory may be comprised of magnetic cores, thin films, electrostatic devices, electrochemical devices, ferroelectric devices, etc.

In an exemplary arrangement set forth subsequently, a word organized magnetic core memory is provided which has a plurality of cores arranged in columns for storing words, with the bits of the respective words being stored in rows. One row of cores is utilized for storing the "flag bits." One or more sense lines are threaded through the data cores to provide an output which indicates that a new word is not the same as a previously stored word. This output is utilized to control the storage of a "flag bit" (such as a binary one) in a "flag bit" core corresponding to the particular word location involved. After the desired number of words have been stored, the "flag bit" cores may be interrogated to determine which words have changed, and the state of each "flag bit" core is indicative of whether or not a new word has been read into the particular column of cores. Thus, the memory not only stores data words, but also, functions as a comparator to determine if a new word which is entered into the memory is the same as the one already stored.

As noted previously, it is frequently the case that only a portion of transmitted information changes between transmission periods. It is therefore possible to load the memory at some rate greater than the transmission rate without loss of information, if desired. By such an arrangement it is possible to utilize a narrow bandwidth and low power transmitter. Additionally, the transmitter may be turned off after all the new information has been transmitted until it is necessary to transmit the next frame, thereby conserving bandwidth and power.

Other features and objects of the invention will be better understood from a consideration of the following detailed description when read in conjunction with the attached drawings in which.

Figure 4:
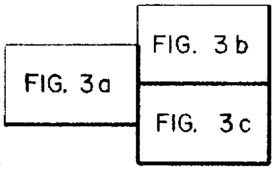
Figure 3A:
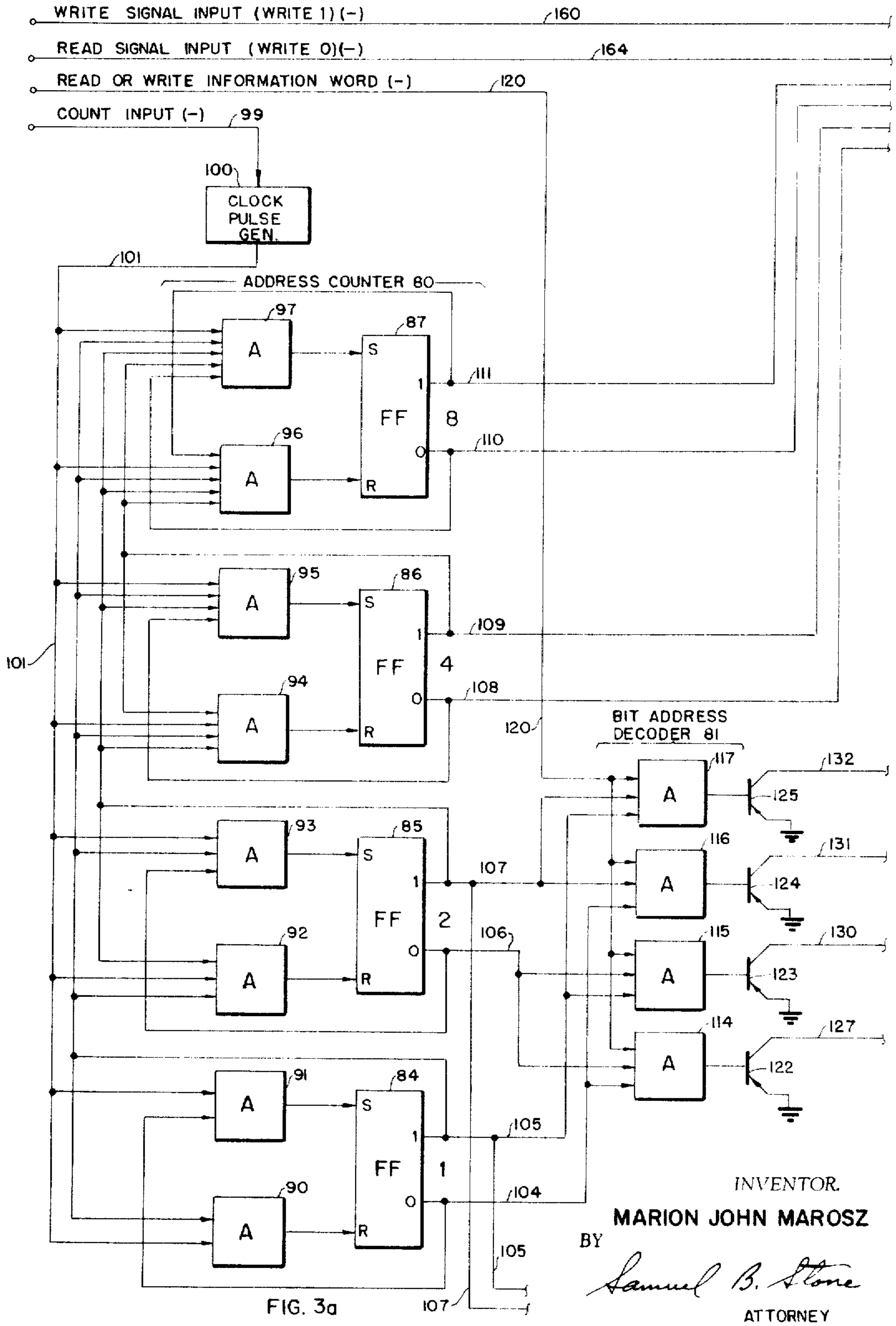
Figure 3B:
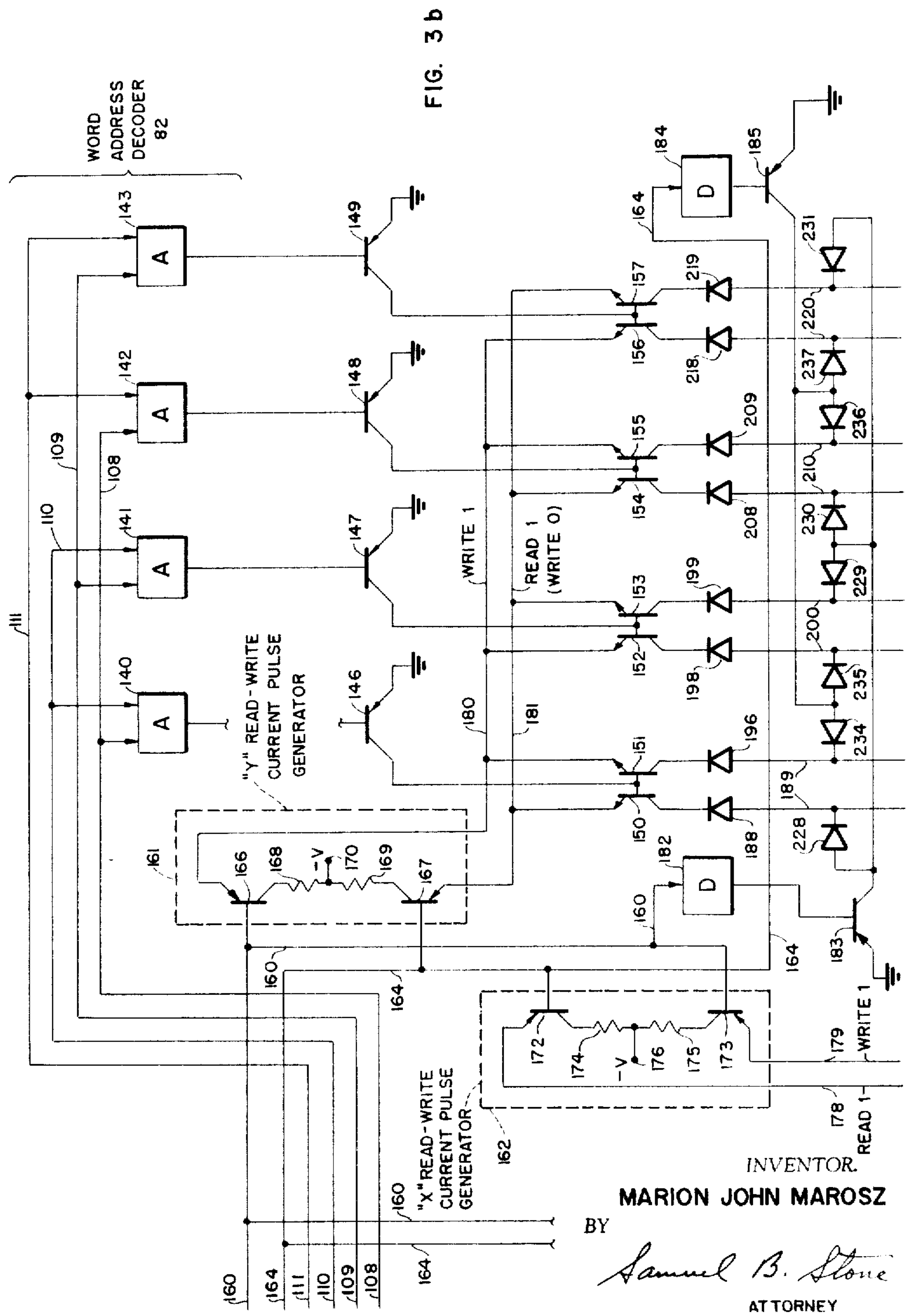
Figure 5:
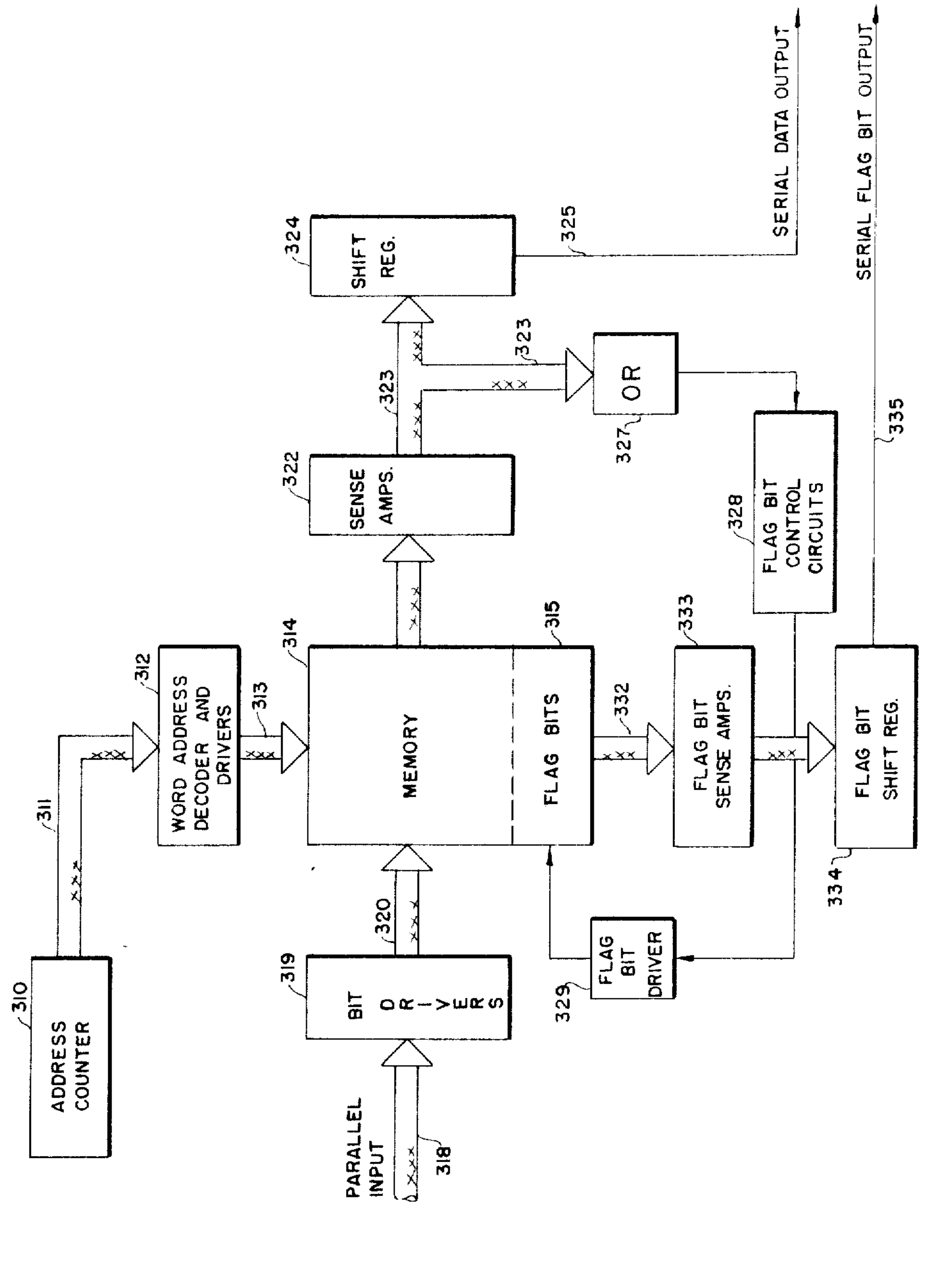
Figure 6:
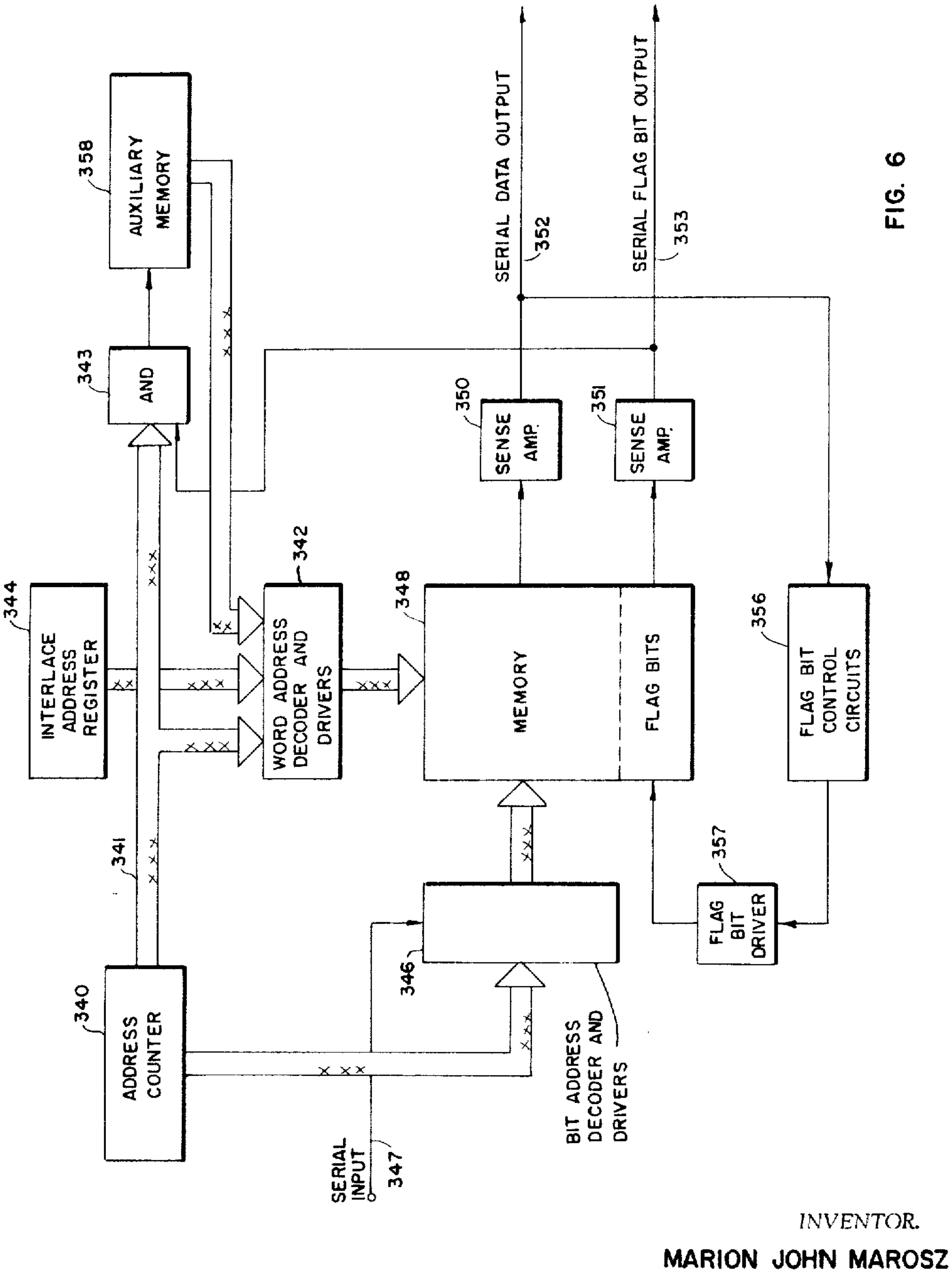

FIGS. 3*a*, 3*b and* 3*c*, when arranged as shown in FIG. 4, illustrate in block diagram and schematic form an exemplary memory arrangement constructed in accordance with the teachings of the present invention;

FIG. 5 illustrates in block diagram form an additional memory arrangement utilizing the teachings of the present invention; and FIG. 6 illustrates in block diagram form a further memory arrangement employing the concepts of the present invention.

In order to give an understanding of the basic principles of the present invention, the following discussion sets forth these principles in connection with a magnetic core memory. However, it is to be understood that the following discussion and the principles of the present invention are equally applicable to other types of memory elements.

Conventional logical elements are illustrated in block form and the bold-face character symbols appearing within a block symbol identify the common name for the circuit represented, that is, A identifies a logical And Circuit, FF a flip-flop, and D a current driver.

Figure 1:
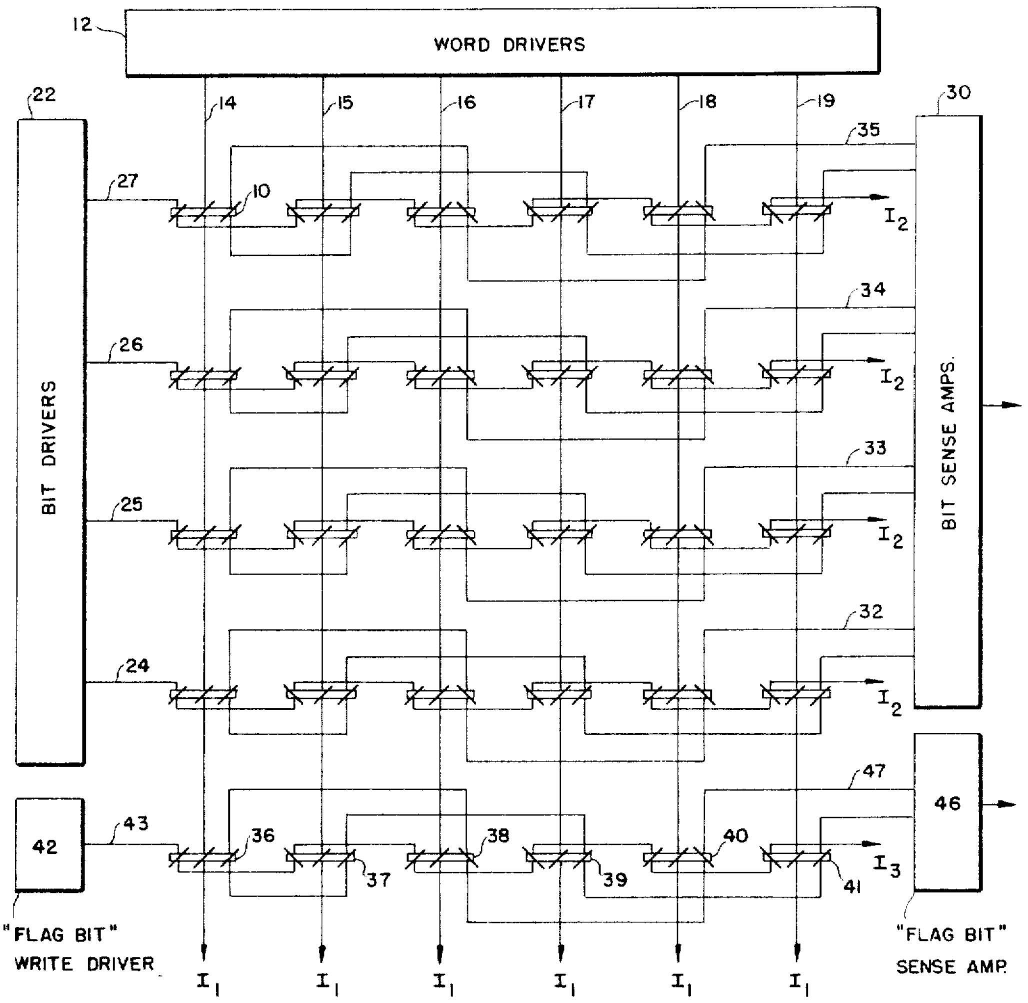
FIG. 1 is a schematic representation of a redundancy reduction memory illustrative of the principles of the present invention.

Referring now to FIG. 1, a magnetic core memory is illustrated which embodies the concepts of the present invention. The magnetic core memory illustrated is substantially a conventional word organized memory with the exception that the bit sense windings are wound to cancel maximum noise from these sense windings. The cores are illustrated by a rectangular symbol denoted by the reference numeral 10. The cores are conventionally arranged in columns, each of which stores one word. The bits of the words are stored in the rows of cores. The exemplary memory illustrated has a capacity of six words, each word being comprised of four bits.

A word drive 12, which includes conventional current drivers and address decoding circuitry to be described subsequently, is connected to selectively apply current $I_1$ to word drive lines 14 through 19. A bit drive 22 is arranged to selectively provide current $I_2$ to bit drive lines 24 through 27. Bit sense amplifiers 30 are connected to bit sense lines 32 through 35.

Cores 36 through 41 serve as "flag bit" storage cores. Each of these cores is threaded by the respective word drive lines 14 through 19. A "flag bit" write driver 42 is connected with a "flag bit" write line 43 which is threaded through the "flag bit" cores 36 through 41. A "flag bit" sense amplifier 46 is connected with a "flag bit" sense line 47 which also is threaded through the cores 36 through 41.

Usual coincident current techniques are utilized in operating the cores in the memory shown in FIG. 1. That is, a word drive line and a bit drive line each supplies one-half of the necessary current to flip a particular core, When a core is flipped, a current is induced in the associated bit sense line. In the particular memory illustrated in FIG. 1, words are written into the columns of cores, and one word is written-in or read-out at a time. In order for the memory to provide the comparison function, data is read into the memory in two cycles. For example, first the zeroes of a word are read into the memory followed by the ones of a word. When a new word is different from a previously stored word, one or more of the cores will flip and induce a current in a respective bit sense line 32 through 35 thereby providing an output indicating that one or more bits of the new word are different from the bits of the old word. If the new word is the same, no cores are flipped and the bit sense lines 32 through 35 provide no outputs. When a new word is different from the previously stored word, the "flag bit" write driver 42 provides a current $I_3$ on the "flag bit" write line 43 to set the core associated with the particular word drive line (which still carries the current $I_1$) involved. As will be discussed subsequently, this is accomplished by sensing the output of the bit sense amplifiers, or a similar component or components, and controlling the current through the "flag bit" write line 43 in response thereto. A set "flag bit" core indicates that a new and different word has been stored. Thus, the "flag bit" cores 36 through 41 may be interrogated to determine which word or words have been changed, and the state of each "flag bit" core 36 through 41 is indicative of whether or not a new word has been read into a particular column of cores. Thus, the memory not only stores words, but also, functions as a comparator to determine if a new word being stored is the same as one previously stored in the memory.

As an example, assume that a word comprising the binary digits 1001 has been previously stored in the leftmost column (threaded by the word drive line 14) of cores. Assume further that the core 10 stores the highest binary digit (a one in this case) and that the new word to be stored is comprised of the binary digits 0001. Zeroes are written first followed by ones. In this case, the core 10 is flipped from the one state to the zero state and an output current is induced in the bit sense line 35 and is applied to the bit sense amplifiers 30. The bit sense amplifiers 30 thus provide an output which indicates that the new word is different from the previously stored word. This output is utilized to control the "flag bit" write driver 42. The "flag bit" write driver 42 supplies the current $I_3$ through the "flag bit" write line 43, and this current in conjunction with the current $I_1$ in the word drive line 14 flips the "flag bit" core 36. Hence, the "flag bit" core 36 is set and indicates that a new word has been stored. At the desired time, the "flag bit" core 36 may be interrogated by applying the current $I_1$ to the word drive line 14 and the current $I_3$ to the "flag bit" write line 43 to thereby induce an output signal in the "flag bit" sense line 47. Where a new word is different from the previously stored word, the column of cores may be sensed to determine which core or cores are flipped in order to ascertain if the new word is larger or smaller than the previously stored word, if desired.

Figure 2:
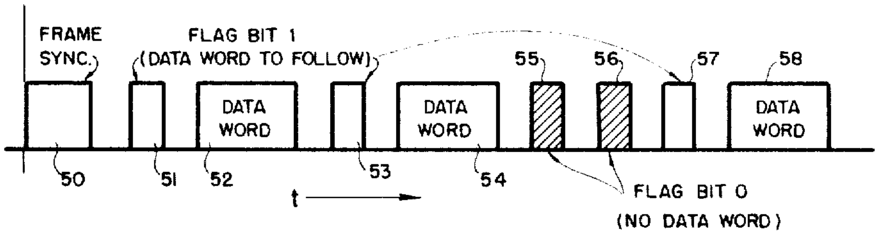
FIG. 2 illustrates the sequence of data word and "flag bit" transmission when the redundancy reduction memory is utilized in the telemetry system.

As noted previously, the "flag bit" cores 36 through 41 may be interrogated to determine which words have been changed. FIG. 2 illustrates an exemplary train of data which may be transmitted by telemetry system. A first pulse 50 provides frame synchronization. A second pulse 51 is a "flag bit" one which is provided by interrogating a "flat bit" core, and this pulse indicates that a new word was stored in the particular word location and therefore this new word which is illustrated by the pulse 52 is to be transmitted. Likewise, the fourth pulse 53 is a "flag bit" one indicating that a new data word 54 is to follow. The sixth pulse 55 is a "flag bit" zero which indicates that a new word was not stored at the particular word location and therefore the word at this location will not be retransmitted and only a "flag bit" will follow. The seventh pulse 56 is a "flag bit" zero and similarly indicates that the data word has not changed and will not be transmitted. The eighth pulse 57 is a "flag bit" one which indicates that a new data word 58 will follow. Although the "flag bit" ones 51, 53 and 57 and the "flag bit" zeroes 55 and 56 are illustrated as being substantially identical in FIG. 2, it is to be understood that the ones and zeroes differ in some characteristic, such as, polarity, width, magnitude, etc., depending upon the particular telemetry coding utilized.

Figure 3C:
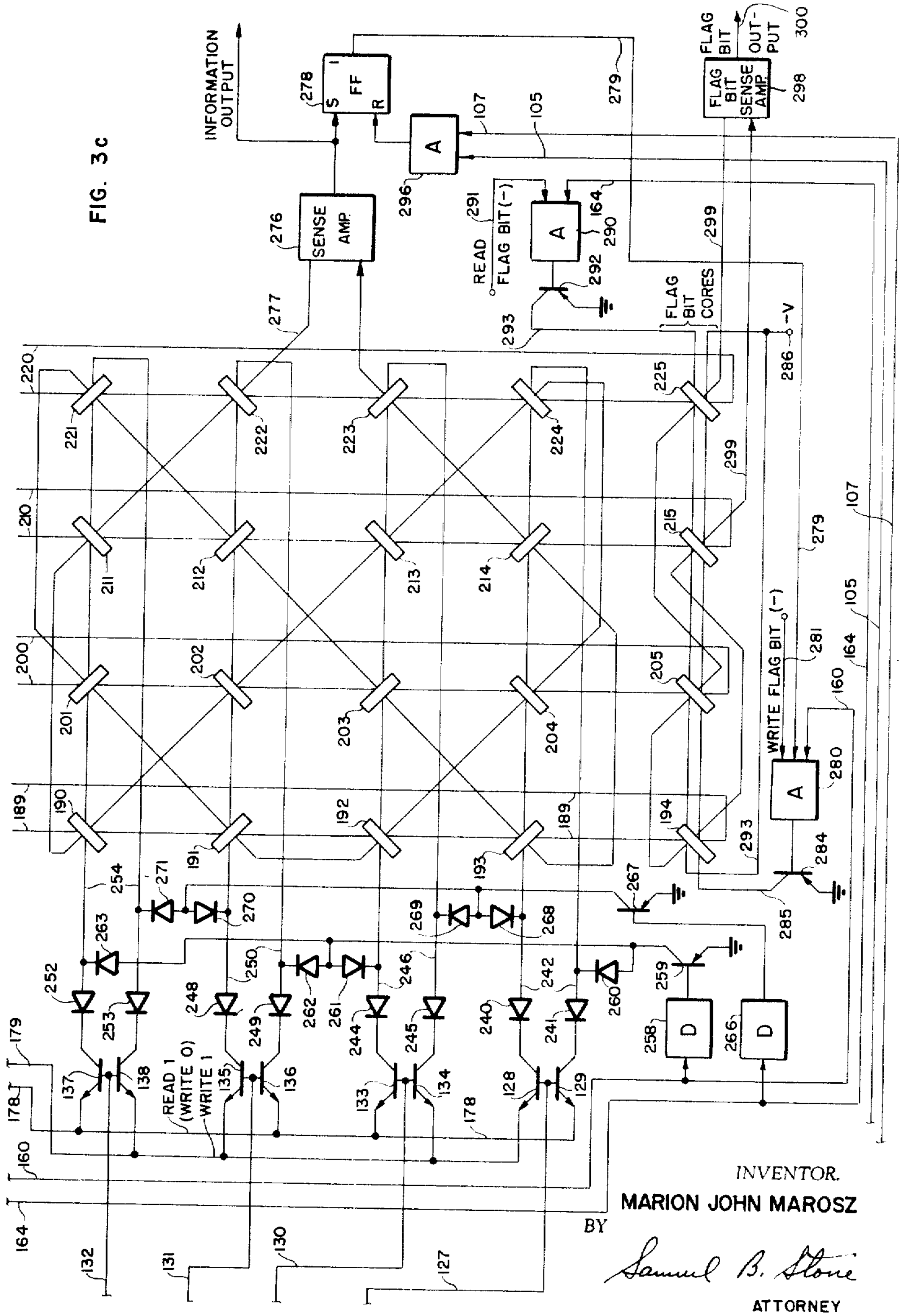

FIGS. 3*a*, 3*b* and 3*c*, when arranged as shown in FIG. 4, illustrate a memory arrangement utilizing the concepts of the present invention in which data is read into and from the memory in a serial fashion. FIG. 3*a* shows an address counter 80 which receives input clock pulses and counts from zero through fifteen, and a bit address decoder 81 for sequentially selecting rows of cores. FIG. 3*b* illustrates a word address decoder 82 which sequentially selects columns of cores. The memory itself, the "flag bit" cores and associated sensing logical circuitry is illustrated in FIG. 3*c*.

The address counter 80 in FIG. 3*a* includes four flip-flops 84 through 87 arranged to provide binary outputs indicative of the numbers zero through fifteen. The address counter 80 also includes eight And circuits 90 through 97. A count input line 99 is connected to a clock pulse generator 100 which supplies clock pulses through a line 101 to each of the And circuits 90 through 97. The And circuits 90, 92, 94 and 96 are connected to the reset inputs of the respective flip-flops 84 through 87, and the And circuits 92, 93, 95 and 97 are connected to the set inputs of the respective flip-flops 84 through 87. The And circuits 90 through 97 and the flip-flops 84 through 87 are interconnected in a conventional manner to count the clock pulses appearing on the line 101, with the flip-flops providing binary outputs indicative of the count. The flip-flop 84 provides zero and one outputs on respective lines 104 and 105. Likewise, the flip-flops 85 through 87 provide zero and one outputs on respective lines 106 and 107, 108 and 109, and 110 and 111.

Initially each of the flip-flops 84 through 87 is in its zero state. In the discussion which follows it is assumed that each of the logical components responds to negative current pulses. That is, an And circuit having all negative inputs provides a negative output, a flip-flop provides a zero output when its zero line is negative and a one output when its one line is negative, etc. Thus, with all of the flip-flops 84 through 87 in their zero states, the respective output lines 104, 106, 108 and 110 are negative. The zero output line 104 of the flip-flop 84 is connected as an input to the And circuit 91. Upon the occurrence of the first clock pulse on the line 101, the And circuit 91 provides an output which sets the flip-flop 84 to its one state. With flip-flop 84 set in the one state, the one output line 105 supplies a negative input to the And circuits 90, and 92 through 97. The zero output line 106 of flip-flop 85 is connected as an input to the And circuit 93, and upon the occurrence of the second clock pulse on the line 101 the And circuit 93 provides an output which sets the flip-flop 85. This second clock pulse also is applied to the And circuit 90 which in turn provides an output to reset the flip-flop 84. The address counter 80 continues to operate in a like manner upon the occurrence of subsequent clock pulses on the line 101 to continuously count from zero through fifteen.

The bit address decoder 81 includes four And circuits 114 through 117 which decode the outputs of the address counter 80. These And circuits 114 through 117 respectively provide outputs zero through three in response to each four clock pulses. The zero output line 104 from the flip-flop 84 is connected to the And circuits 114 and 116, and the one output line 105 from this flip-flop is connected to the And circuits 115 and 117. The zero output line 106 of the flip-flop 85 is connected to the And circuits 114 and 115, and the one output line 107 of this flip-flop is connected to the And circuits 116 and 117. A read or write information word line 120 is connected to each of the And circuits 114 through 117 to provide a conditioning input to these And circuits when information is to be read from or written into the memory. The outputs of the And circuits 114 through 117 are connected to the bases of respective transistor switches 122 through 125. The emitters of these transistors are each grounded, and their collectors are connected to the bases of transistors associated with the memory illustrated in FIG. 3*c* which will be described in greater detail subsequently.

As noted previously, the bit address decoder functions to count each four clock pulses and to address specific bits in the memory. When all of the flip-flops 84 through 87 are in their zero states, negative inputs are applied to the And circuit 114 by the lines 104 and 106. When a read or write information word signal is applied through the line 120, the And circuit 114 provides a negative output to the base of the transistor 122 thereby turning on this transistor. When this transistor turns on, its collector is effectively grounded. The collector of the transistor 122 is connected through a line 127 to the bases of transistors 128 and 129 which are connected with a row of cores in the memory shown in FIG. 3*c*. As will be discussed in greater detail subsequently, the transistors 128 and 129 are turned on when the transistor 122 is turned on.

The collectors of transistors 123 through 125 are connected through respective lines 130 through 132 to respective pairs of transistors 133 and 134, 135 and 136, and 137 and 138 in FIG. 3*c*. The And circuits 115 through 117 and the transistors 123 through 125 function in a manner similar to the And circuit 114 and transistor 122 to turn on the respective pairs of transistors 133 and 134, 135 and 136, and 137 and 138. Thus, the And circuit 114 turns on the transistor 122 at zero clock pulse time, the fourth pulse, the eighth pulse, etc. Likewise the And circuits 115 through 117 turn on the respective transistors 123 through 125 upon the occurrence of respective clock pulses one through three, five through seven, etc.

The word address decoder 82 shown in FIG. 3*b* includes four And circuits 140 through 143. These And circuits function in a manner similar to the And circuits 114 through 117 in the bit address decoder 81 in FIG. 3*a*. However, the And circuit 140 provides an output during clock pulses zero through three, the And circuit 141 provides an output during clock pulses four through seven, the And circuit 142 provides an output during clock pulses eight through eleven and the And circuit 143 provides an output during clock pulses twelve through fifteen. The zero output line 108 of flip-flop 86 is connected to the And circuits 140 and 142, and the one ouput line 109 from this flip-flop is connected to the And circuits 141 and 143. The zero output line 110 from the flip-flop 87 is connected to the And circuits 140 and 141, and the one output line 111 from this flip-flop is connected to the And circuits 142 and 143. The outputs of the And circuits 140 through 143 are connected to the bases of respective transistors 146 through 149. The emitters of each of the transistors 146 through 149 are grounded, and the collectors thereof are connected to respective pairs of transistors 150 and 151, 152 and 153, 154 and 155, and 156 and 157. The transistors 146 through 149 function in the same manner as the transistors 122 through 125 in FIG. 3*a*, and when turned on serve to turn on the associated respective pairs of transistors. Thus, the And circuits 140 through 143 and the transistors 146 through 149 in the word address decoder 82 serve to select columns of cores (and therefore word locations) in the memory shown in FIG. 3*c*.

Since both the flip-flops 86 and 87 in the address counter 80 in FIG. 3*a* are in their zero state during clock pulses zero through three, the And circuit 140 in the word address decoder 82 in FIG. 3*b* provides an output during the zero through three clock pulses. During clock pulses four through seven, the output of the flip-flop 86 is a one and the output of the flip-flop 87 is a zero. The And circuit 141 senses this particular condition to provide an output during clock pulses four through seven. The And circuit 142 functions in a similar manner to detect a zero output from the flip-flop 86 and a one output from the flip-flop 87. In a similar manner, the And circuit 143 detects a one output from both of the flip-flops 86 and 87.

A write signal input line 160 (FIG. 3*a*) is connected to a "Y" read-write current pulse generator shown within the dashed line box 161 in FIG. 3*b*. This write line 160 also is connected to an "X" read-write current pulse generator shown within the dashed line box 162 in FIG. 3*b*. A read signal input line 164 (FIG. 3*a*) also is connected to the "Y" and "X" pulse generators 161 and 162 in FIG. 3*b*. The "Y" pulse generator 161 includes a pair of transistors 166 and 167, the collectors of which are connected through respective resistances 168 and 169 to a negative voltage source terminal 170. The write line 160 is connected to the base of the transistor 166, and the read line 164 is connected to the base of the transistor 167. The emitter of the transistor 166 is connected through a line 180 to the emitters of the transistors 151, 152, 155 and 156. The emitter of the transistor 167 is connected through a line 181 to the emitters of the transistors 150, 153, 154 and 157.

The "X" pulse generator 162 includes transistors 172 and 173. The collectors of the transistors 172 and 173 are connected through respective resistances 174 and 175 to a negative voltage source terminal 176. The read line 164 is connected to the base of the transistor 172, and the write line 160 is connected to the base of the transistor 173. The emitter of the transistor 172 is connected through a line 178 to the emitters of transistors 129, 133, 136 and 137 in FIG. 3*c*. The emitters of the transistor 173 is connected through a line 179 to the emitters of the transistors 128, 134, 135 and 138 in FIG. 3*c*.

The write line 160 also is connected through a current driver 182 to the base of a switching transistor 183 in FIG. 3*b*. The read line 164 is connected to a current driver 184, and this current driver is connected to the base of a switching transistor 185. Briefly, the And circuits 140 through 143 and the respective switching transistors 146 through 149 serve to turn on a pair of the respective transistors 150 and 151, 152 and 153, 154 and 155, and 156 and 157 thereby selecting a particular word location in the memory. The switching transistors 183 and 185 serve to determine the direction of current flow through the word lines threading the respective columns of cores.

The collector of the transistor 150 is connected through a diode 188 to a word drive line 189. The word drive line 189 is threaded through a first column of cores including word cores 190 through 193 and a "flag bit" core 194. The word drive line 189 is connected through a diode 196 to the collector of the transistor 151. The collectors of transistors 152 and 153 are similarly connected through respective diodes 198 and 199 to a word drive line 200 which is threaded through cores 201 through 205. The collectors of the transistors 154 and 155 are connected through respective diodes 208 and 209 to a word drive line 210 which is threaded through cores 211 through 215. Likewise, the collectors of the transistors 156 and 157 are connected through respective diodes 218 and 219 to a word drive line 220 which is threaded through cores 221 through 225.

The collector of the transistor 183 (FIG. 3*b*) is connected through a diode 228 to the word drive line 189, through diodes 229 and 230 to respective word drive lines 200 and 210, and through a diode 231 to the word drive line 220. The emitter of the transistor 183 is grounded. The collector of the transistor 185 is connected through diodes 234 and 235 to respective word drive lines 189 and 200, and through diodes 236 and 237 to respective word drive lines 210 and 220. The emitter of the transistor 185 is grounded.

Assuming that a word is to be written into the first column of cores 190 through 193 in FIGURE 3*c*, the output from the And circuit 140 in the word address decoder 82 in FIG. 3*b* turns on the transistor 146. When the transistor 146 turns on, ground potential is applied to the bases of the transistor switches 150 and 151 thereby turning on these transistors. Since a word is being written into the column of cores, one of the lines 160 or 164 will supply a negative signal to the "Y" read-write current pulse generator 161 in FIG. 3*b*. Assuming that a one, for example, is being written into one of the cores 190 through 193, the write line 160 turns on the transistor 166. When the transistor 166 is turned on, a negative voltage is applied from the negative voltage terminal 170, through the resistance 168, through the transistor 166 and through the line 180 to the emitter of the transistor 151. Also, the write line 160 supplies a signal through the driver 182 to turn on the transistor 183. Thus, a current path exists from ground, through the emitter-collector path of the transistor 183, the diode 228, the word drive line 189 which is threaded through the cores 190 through 194, the diode 196, the collector-emitter path of the transistor 151, the line 180, the emitter-collector path of the transistor 166, and the resistance 168 to the negative voltage terminal 170. A similar operation takes place to pass current in the desired direction through the word drive lines 200, 210 and 220 during clock pulses four through seven, eight through eleven and twelve through fifteen, respectively.

If it is desired to read from (or to write a zero) the first column of cores, the read line 164 supplies a signal to turn on the transistor 167. The signal on the read line also is applied through the driver 184 in FIG. 3*b* to turn on the transistor 185. In this case, a current path is established from ground, through the emitter-collector path of the transistor 185, the diode 234, the word drive line 189, the diode 188, the collector-emitter path of the transistor 150, the line 181, the emitter-collector path of the transistor 167, and the resistance 169 to the negative voltage terminal 170. Thus, it now should be apparent how the columns of cores are selected.

The pairs of transistors 128 and 129, 133 and 134, 135 and 136, and 137 and 138 operate in conjunction with the respective And circuits 114 through 117 and the respective transistors 122 through 125 and the associated diodes to select a row of cores. By selecting a particular column of cores and a particular row of cores, one specific core is selected into which information is written or from which information is read. The collectors of the transistors 128 and 129 are connected through respective diodes 240 and 241 to a bit drive line 242 which is threaded through the row of cores 193, 204, 214 and 224. The collectors of the transistors 133 and 134 are connected through respective diodes 244 and 245 to a bit drive line 246 which is threaded through the cores 192, 203, 213 and 223. The collectors of the transistors 135 and 136 are connected through respective diodes 248 and 249 to a bit drive line 250 which is threaded through the cores 191, 202, 212 and 222. Likewise, the collectors of the transistors 137 and 138 are connected through respective diodes 252 and 253 to a bit drive line 254 which is threaded through the cores 190, 201, 211 and 221.

The word drive line 160 is connected through a current driver 258 to the base of a switching transistor 259. The collector of the transistor 259 is connected through a diode 260 to the bit drive line 242, through diodes 261 and 262 to respective bit drive lines 246 and 250, and through a diode 263 to the bit drive line 254. The emitter of the transistor 259 is grounded. The read drive line 164 is connected through a current driver 266 to the base of a switching transistor 267. The collector of the transistor 267 is connected through diodes 268 and 269 to respective bit drive lines 242 and 246, and through diodes 270 and 271 to respective bit drive lines 250 and 254. The emitter of the transistor 267 is grounded.

Assuming that a zero clock pulse (which may be a reset pulse or the last pulse from a previous series of pulses) is applied on the line 101 (FIG. 3*a*) and a negative signal is applied to the read or write information word line 120, the And circuit 114 provides an output which turns on the transistor switch 122. When the transistor switch 122 turns on, it turns on the transistor switches 128 and 129. Further assuming that a bit one is being written into one of the cores 193, 204, 214 or 224, the write line 160 supplies a signal which turns on the transistor 173 in the "X" pulse generator 162 in FIG. 3*b*. Additionally, the word drive line 160 supplies a signal through the driver 258 to turn on the transistor 259 in FIG. 3*c*. Thus, a current path exists from ground, through the emitter-collector path of the transistor 259, the diode 260, the bit drive line 242 which is threaded through the cores 224, 214, 204 and 193, the diode 240, the collector-emitter path of the transistor 128, the line 179, the emitter-collector path of the transistor 173, and the resistance 175 to the negative voltage terminal 176. If information is being read from (or a zero is being written) one of the cores 193, 204, 214 or 224, the read line 164 supplies a signal to turn on the transistor 172 in the "X" pulse generator in FIG. 3*b*, and supplies a signal through the current driver 266 (FIG. 3*c*) to turn on the transistor 267. In this case, a current path exists from ground, through the emitter-collector path of the transistor 267, the diode 268, the bit drive line 242, the diode 241, the collector-emitter path of the transistor 129, the line 178, the emitter-collector path of the transistor 172, and the resistance 174 to the negative voltage terminal 176. When current exists in the bit drive line 242 one of the cores 193, 204, 214 or 224 will be written into or read from depending upon which of the respective word drive lines 189, 200, 210 or 220 is passing current. In this manner a bit of a word is written into or read from a specific core in the memory.

A sense amplifier 276 is connected with a sense winding 277 which is threaded through all of the word cores in the memory in FIG. 3*c*. The amplifier 276 detects a change of state of any core in the memory and provides a serial output in a conventional manner. Additionally, the output of the sense amplifier 276 is utilized to control the storage of a "flag bit" when a new word which is different from a previously stored word is stored in the memory. The output of the sense amplifier 276 is connected to the set input of a flip-flop 278. The one output of the flip-flop 278 is connected through a line 279 to an And circuit 280. The write line 160 also is connected to the And circuit 280. A write "flag bit" line 281 is connected to the And circuit 280 and provides an input to this And circuit when words are being written into the memory. The output of the And circuit 280 is connected to the base of a switching transistor 284. The emitter of the transistor 284 is grounded, and its collector is connected to a "flag bit" write line 285 which is threaded through the "flag bit" cores 194, 205, 215 and 225, and connected to a negative voltage terminal 286.

The read line 164 is connected to an And circuit 290. A read "flag bit" line 291 is connected to the And circuit 290 to supply a conditioning input to this And circuit when "flag bits" are being read from the cores 194, 205, 215 and 225. The output of the And circuit 290 is connected to the base of a switching transistor 292. The emitter of the transistor 292 is grounded, and its collector is connected to a read "flag bit" line 293 which is threaded through the cores 225, 215, 205, 194, and connected to the negative voltage terminal 286. The one output line 105 from the flip-flop 84 (FIG. 3*a*) and the one output line 107 from the flip-flop 85 are connected to an And circuit 296 in FIG. 3*c*. The output of the And circuit 296 is connected to the reset input of the flip-flop 278 to reset this flip-flop when the flip-flops 84 and 85 are reset to zero (after the third, seventh, eleventh, fifteenth, etc., clock pulses). A "flag bit" sense amplifier 298 is connected to a "flag bit" sense winding 299 which is threaded through the cores 225, 205, 194 and 215 to sense the "flag bits." It should be noted that although the memory arrangement in FIGS. 3*a* through 3*c* is shown to operate with negative current pulses, positive pulses may be used by changing the transistor types and by reversing the diodes.

As noted previously, the zeros of a word are written into the cores and then the ones of a word are written in. This takes place during one clock pulse time. With the particular memory arrangement illustrated in FIG. 3*c*, the words are stored in the column of cores and bits are stored in the cores in the rows. For example, the first word may be stored in cores 190 through 193, with the first bit being stored in the core 193, the second bit being stored in the core 192, the third bit being stored in the core 191 and the fourth bit of the word being stored in the core 190. It is to be understood that a larger memory may be utilized if desired.

Assuming that the binary digits 1001 are stored in the respective cores 190 through 193 and that a new word 1000 is to be entered into these cores, the core 193 will flip from the one state to the zero state. When the core 193 flips, it induces a current pulse in the sense winding 277, and this current pulse is applied through the sense amplifier 276 to the set input of the flip-flop 278 thereby setting this flip-flop to its one state. If the new word is the same as the old word, no core will flip and thus no current pulse will be induced in the sense winding 277 and the flip-flop 278 would not be set. Since a word is being written into the memory in this example, the write "flag bit" line 281 is energized thereby providing a conditioning input to the And circuit 280. When the flip-flop 278 switches to its one state, the line 279 supplies a signal from the flip-flop 278 to the And circuit 280. When any bit of a particular word changes, the flip-flop 278 is set in this manner and remains set until all bits in that particular word had been stored (until both the flip-flops 84 and 85 in FIG. 3*a* are reset to zero).

Since a zero is written into the core 193, the read line 164 is negative rather than the write line 160. However, the write line 160 is energized after the read line 164 is energized and therefore supplies the necessary third input to the And circuit 280. When this occurs, the And circuit 280 turns on the transistor 284. When the transistor 284 turns on a current path exists from ground, through the emitter-collector path of the transistor 284, and the write "flag bit" line 285 to the negative voltage terminal 286. A write current also exists at this time through the write drive line 189 and, hence, the "flag bit" core 194 is set thereby storing the new bit and indicating that the new word was different from the old word.

Any one or more of the bits of the new word may be different from the old word previously stored, and the sense amplifier 276 and flip-flop 278 will operate in the same manner to sense this change. It should be noted that the flip-flop 278 is set upon the occurrence of the first changed bit in any particular word, and any further differences in the bits of that word have no effect on the flip-flop 278. In a like manner, the remaining "flag bit" cores 205, 215 and 225 may be set or not depending upon whether the new word is different or not.

After all words have been stored in the memory, the "flag bit" cores 194, 205, 215 and 225 may be interrogated to determine which words changed. At this time the read line 164 provides a negative input to the And circuit 290, and the read "flag bit" line 291 supplies a negative input to the And circuit 290. The And circuit 290 turns on the transistor 292. Thus, a current path exists from ground, through the emitter-collector path of the transistor 292 and the read "flag bit" line 293 which is threaded through the cores 225, 215, 205 and 194 and connected to the negative voltage terminal 286. Current is sequentially applied through the word drive lines 189, 200, 210 and 220 and any "flag bit" cores which have been set will be sequentially flipped to induce an output current in the "flag bit" sense winding 299. This output is applied through the "flag bit" sense amplifier 298 to a "flag bit" output line 300.

The "flag bits" may be utilized in several ways. They may be read out directly to indicate which words have changed, be utilized to prevent the read-out of unchanged words, or the entire set of "flag bits" may be read out one at a time into a shift register and subsequently shifted out in a serial fashion. Similarly, the "flag bits" may be read out in parallel if desired. In the arrangement illustrated in FIG. 3*c*, it may be preferable to transmit the "flag bits" just before the information word is transmitted. In this case, if a "flag bit" one is transmitted at the beginning of the word, the word is transmitted. If the "flag bit" is a zero, then the word will not be transmitted and the following bit also will be a "flag bit." This sequence of bits and words is illustrated in FIG. 2 and was discussed previously. Alternatively, the "flag bits" may be read out in parallel into a shift register. This information is then shifted and circulated and transmitted. In a telemetry system this will be the first word transmitted. This word indicates which and how many words subsequently will be transmitted in the following frame. In transmitting the information the words may be read out in parallel and shifted out in series. During the shift transmit phase the "flag bit" shift register may be shifted at a high rate to the next one (indicates a changed word). The number of shifts may be counted by an address register, and when a one appears at the end of the shift register the address counter is stopped at that address and waits until a data register is ready for the next word. This latter method of transmission is suitable only for small memories since a large memory would require a very long "flag bit" shift register.

FIG. 5 illustrates in block diagram form a redundancy reduction memory for high speed serial operation The only essential difference between this arrangement and that shown in FIGS. 3*a* through 3*c* is the parallel input to the memory and the parallel output from the memory. A conventional address counter 310 is connected through a cable 311 to a conventional word address decoder and drivers 312. The word address decoder and drivers 312 is connected through a cable 313 to a memory having an information storage portion 314 and a "flag bit" storage portion 315. This memory may be constructed like that illustrated in FIG. 1.

Data bits are applied in parallel to the memory arrangement ilustrated in FIG. 5 through an input cable 318, bit drivers 319 and a cable 320. Data is read from the information storage portion 314 of the memory by means of sense amplifiers 322. The outputs of the sense amplifiers 322 are connected through a cable 323 in parallel to a shift register 324. The data is read into the shift register 324 in parallel, and is shifted out on an output line 325 in series. The outputs of the sense amplifiers 322 also are applied through the cable 323 to an Or circuit 327. The Or circuit 327 provides an output signal which is applied to "flag bit" control circuits 328 whenever one or more bits of a new word are different from those of a previously stored word. The "flag bit" control circuits 328 may be like those illustrated in FIG. 3*c*. The Or circuit 327 is necessary since a plurality of sense amplifiers are utilized for the parallel read-out of the data from the portion 314 of the memory. The "flag bit" control circuits 328 function to control a "flag bit" driver 329 which in turn controls the storage of "flag bits" in the "flag bit" portion 315 of the memory.

The "flag bit" portion 315 of the memory is connected through a cable 332 to "flag bit" sense amplifiers 333. The "flag bits" are read out in parallel through the "flag bit" sense amplifiers 333 to a "flag bit" shift register 334. Subsequently, the "flag bits" may be shifted from the "flag bit" shift register 334 in a serial fashion on an output line 335.

In the arrangement illustrated in FIG. 5, the zeroes and then the ones of each word are written into the memory in parallel. The words are read out in parallel in a linear select mode. The "flag bits" are read out in parallel into the shift register 334. In a telemetry system the "flag bits" may be shifted from the shift register 334 in series on the output line 335, and these flag bits may comprise the first word transmitted. This word indicates which and how many words will be transmitted in the following frame. In transmitting the data, the words are read out in parallel into the shift register 324 and shifted out in serial. The arrangement in FIG. 5 may be operated by shifting the "flag bit" shift register 334 at a high speed until a "flag bit" one (indicating a changed word) is encountered. The "flag bit" shift register may be connected with the address counter 310 which counts the number of shifts and then stops at that address to read out the corresponding data word which has changed. This method of operation mainly is suitable only for small memories because large memories require a very long "flag bit" shift register.

An alternative memory arrangement is illustrated in FIG. 6. This arrangement is substantially identical to that illustrated in FIGS. 3*a* through 3*c* except for the addition of a small auxiliary memory and an interlace address register. In this arrangement, the "flag bits" are read out serially and for every changed word the address is stored in the auxiliary memory. Since only a portion of the words generally will change from frame to frame, this auxiliary memory need only have a capacity which is a fraction of the main storage capacity. After the "flag bits" are read out serially, the information is addressed from the auxiliary memory and each information word is transmitted in a serial fashion. An address counter 340 is connected through a cable 341 to a word address decoder and drivers 342 and to an And circuit 343. An interlace address register 344 is also connected to the word address decoder and drivers 342. The address counter 340 also is connected to a bit address decoder and drivers 346. Data is applied to the bit address decoder and drivers 346 serially by means of an input line 347. The word address decoder and drivers 342 and the bit address decoder and drivers 346 are connected with a memory 348 in a conventional manner. A sense amplifier 350 is connected with the memory 348 in the same manner as the sense amplifier 276 in FIG. 3*c* is connected with the memory. Likewise, a "flag bit" sense amplifier 351 is connected with the "flag bit" storage portion of the memory 348. Serial data output is applied on an output line 352 which is connected from the sense amplifier 350. Likewise, the "flag bits" are read out serially on an output line 353 connected from the "flag bit" sense amplifier 351.

The output of the sense amplifier 350 is connected with "flag bit" control circuits 356. The output of the "flag bit" control circuits 356 are connected with a "flag bit" driver 357 which controls the storage of "flag bits." The "flag bit" control circuits 356 are the same as the "flag bit" control circuits 328 in FIG. 5 and the same as the circuits illustrated in FIG. 3*c*.

The output of the "flag bit" sense amplifier 351 also is applied to the And circuit 343. The output of the And circuit 343 is applied to an auxiliary memory 358. The output of the auxiliary memory 358 is connected with the word address decoder and drivers 342.

As will be apparent to those skilled in the art, the address of every changed word is stored in the auxiliary memory 358. After the "flag bits" are read out serially, the information is addressed from the auxiliary memory 358 and each word is then transmitted in a serial fashion. The interlace address register 344 controls the read-out of the memory at a desired rate. This register is utilized since data to be stored may be supplied at one rate and it may be desired to read-out data at a different rate.

It now should be apparent that the present invention provides a memory arrangement for storing data and for determining if new and different data has been read into the memory. A comparison between new data and previously stored data takes place within the memory itself. Data is read into the memory in two cycles and conventional coincident current techniques may be utilized in reading and writing the data. When a new word is different from a previously stored word an output is provided which indicates this event, and a "flag bit" is stored. The stored "flag bit" indicates that a new word has been stored in the particular memory location. The memory may be comprised of magnetic cores, thin films, electrostatic, electrochemical, ferroelectric devices, etc.

Although exemplary embodiments of the invention have been disclosed and discussed, it will be understood that other applications and arrangements are possible and that the embodiments disclosed may be subjected to various changes, modifications and substitutions without necessarily departing from the spirit of the invention.

What is claimed is:

1. In a memory comprising a first and second plurality of devices having at least two states and arranged in an array, first means connected with said array for receiving data and for controlling the storage thereof in one or more of said first plurality of devices, second means connected with said first plurality of devices for reading data therefrom, the improvement comprising third means connected with said second means and with said second plurality of devices for controlling the storage of "flag bits" in said second plurality of devices when new data stored under the control of said first means is different from data previously stored in a particular location in said array.

2. In a redundancy reduction memory, an array of bistable devices, addressing and driving means connected with said array of bistable devices for controlling the storage of data therein, first means connected with said array of bistable devices for reading data therefrom, the improvement comprising a portion of said bistable devices being adapted to store information indicating that new data being stored in said array is different from that previously stored in a particular location in said array, said first means being arranged to detect when new data being stored is different from that previously stored in a particular memory location, and second means connected with said first means and controlled by said first means to control the operation of said portion of bistable devices.

3. In a redundancy reduction memory, a plurality of bistable devices arranged in an array, a first plurality of said bistable devices being arranged to store data words, first means connected with said array of bistable devices for receiving input data and controlling the storage thereof in said first plurality of bistable devices, second means connected with said plurality of bistable devices for reading the data words therefrom and for providing an output when a new data word is different from a data word previously stored at a particular memory location, the improvement comprising a second plurality of said bistable devices in said array being arranged to store "flag bits" which are indicative of changed words, and third means connected with said second means and operative to control the storage of "flag bits" indicating changed words in said second plurality of bistable devices when said second means provides an indication that a new data word is different from the data word previously stored in a particular memory location.

4. In a redundancy reduction memory as in claim 3 wherein said first means causes the zeroes of a data word to be stored in certain of said first plurality of bistable devices and then causes the ones of a data word to be stored in certain of said first plurality of bistable devices.

5. In a redundancy reduction memory as in claim 3 wherein said third means controls the read-out of "flag bits" from said second plurality of bistable devices, and said third means includes a bistable device which is set when a new data word is different from a data word previously stored in a particular location in said array.

6. A memory for storing and comparing information comprising a first and second plurality of devices having at least two states and arranged in an array, first means connected with said array for receiving data and for controlling the storage thereof in one or more of said first plurality of devices, second means connected with said first plurality of devices for reading data therefrom, the improvement comprising said second means including third means for providing an output signal when new data stored under the control of said first means is different from data previously stored in a particular location in said array, and fourth means connected with said third means and with said second plurality of devices for controlling the storage of "flag bits" in said second plurality of devices at a predetermined time when said third means provides an output signal indicating that the new data is different from the data previously stored in a particular location in said array.

7. A memory as in claim 6 wherein said data includes binary zeroes and ones, with said zeroes of an element of data being stored in said memory followed by the ones of said element of data being stored in said memory, and said third means includes a logical device having at least two stable states and which is set to one of said stable states when new data stored under the control of said first means is different from data previously stored in a particular location in said array.

8. A redundancy reduction memory comprising a plurality of bistable devices, a first plurality of said bistable devices being arranged to store a plurality of data words each of which comprises a plurality of binary bits, first means connected with said bistable devices for receiving input data and controlling the storage thereof in said first plurality of bistable devices, second means connected with said first plurality of bistable devices for reading the data words therefrom, the improvement comprising third means connected with said second means for providing an output signal when a new data word is different from a data word previously stored in a particular group of said first plurality of bistable devices, a second plurality of said bistable devices being arranged to store "flag bits" which are indicative of the existence of and location of changed words, and fourth means connected with said third means and said second plurality of bistable devices to control the storage of "flag bits" in said second plurality of bistable devices in response to a signal from said third device indicating that a new data word is different from the data word previously stored in a particular memory location.

9. A redundancy reduction memory as in claim 8 wherein, said first means includes an auxiliary storage device for storing data word addresses of said first plurality of bistable devices for each of the new data words which are different from the data words previously stored in said first plurality of bistable devices.

10. In a memory for storing and comparing information, a first and second plurality of devices having at least two states for storing information, first means connected with said first plurality of devices for reading data therefrom, the improvement comprising said first means including second means for providing an output signal when new data stored in a particular group of said first plurality of devices is different from data previously stored in said group of said first plurality of devices, and third means connected with said second means and with said second plurality of devices for controlling the storage of "flag bits" in said second plurality of devices at a predetermined time when said second means provides an output signal.

11. A method of storing and comparing data in a memory, the steps comprising providing new data in the form of binary bits to be stored in said memory, storing first binary bits of an element of said new data in a particular section of said memory, storing second binary bits of said element of new data in said particular section of said memory, detecting any differences in the binary bits of said element of new data stored in said particular section of said memory with respect to an element of data previously stored in said particular section of said memory, and storing a single binary bit in said memory when a difference exists between said element of new data and said previously stored element of data.

12. A method of storing and comparing data in a memory as in claim 11 wherein said element of data is a data word, and said first binary bits are binary zeroes and said second binary bits are binary ones.

References Cited by the Examiner

UNITED STATES PATENTS

| | | | |
|---|---|---|---|
| 3,121,217 | 2/1964 | Seeber et al. | 340—174 |
| 3,185,823 | 5/1965 | Ellersick et al. | 340—172.5 |
| 3,195,109 | 7/1965 | Behnke | 340—172.5 |

ROBERT C. BAILEY, *Primary Examiner.*

P. L. BERGER, *Assistant Examiner.*